US011474210B2

(12) United States Patent
Birnbacher (10) Patent No.: US 11,474,210 B2
(45) Date of Patent: Oct. 18, 2022

(54) METHOD AND DEVICE FOR OPTICAL DISTANCE MEASUREMENT COMPRISING A SINGLE EVALUATION UNIT WITH TIME MULTIPLEXING TO EVALUATE REFLECTED MEASUREMENT PULSES

(71) Applicant: Ibeo Automotive Systems GmbH, Hamburg (DE)

(72) Inventor: Wolfgang Birnbacher, Hamburg (DE)

(73) Assignee: IBEO AUTOMOTIVE SYSTEMS GmbH, Hamburg (DE)

( * ) Notice: Subject to any disclaimer, the term of this patent is extended or adjusted under 35 U.S.C. 154(b) by 912 days.

(21) Appl. No.: 16/280,401

(22) Filed: Feb. 20, 2019

(65) Prior Publication Data

US 2019/0257925 A1    Aug. 22, 2019

(30) Foreign Application Priority Data

Feb. 21, 2018   (EP) .................................. 18157748

(51) Int. Cl.
*G01S 7/48*   (2006.01)
*G01S 7/481*  (2006.01)
(Continued)

(52) U.S. Cl.
CPC ............ *G01S 7/4817* (2013.01); *G01S 7/484* (2013.01); *G01S 7/487* (2013.01); *G01S 7/4815* (2013.01);
(Continued)

(58) Field of Classification Search
CPC .......... G01S 17/10; G01S 17/00; G01S 17/02; G01S 17/04; G01S 17/08; G01S 17/06;
(Continued)

(56) References Cited

U.S. PATENT DOCUMENTS 8,920,331 B2 * 12/2014 Ouchi ................ A61B 5/02444
600/501

FOREIGN PATENT DOCUMENTS

DE          197 17 399 A1    6/1999
DE       10 2010 006 943 A1    8/2011
EP         3 168 641 A1    5/2017

OTHER PUBLICATIONS

Search Report issued for corresponding European Patent Application No. EP 18 15 7748, dated Jul. 6, 2018, with an English translation.

* cited by examiner

*Primary Examiner* — Que Tan Le
(74) *Attorney, Agent, or Firm* — Myers Wolin, LLC (57) ABSTRACT

A method for optical distance measurement is provided, comprising emitting measurement pulses and receiving reflected measurement pulses. One transmission element is associated with the each receiving element. The method comprises the definition of a first group of receiving elements, wherein the transmission elements each emit at least one measurement pulse for distance measurement. Emitted measurement pulses are reflected on an object within a measurement range and the receiving elements of the first group receive the reflected measurement pulses. In evaluating the reflected measurement pulses received by the receiving elements, a single evaluation unit is used with time multiplexing, wherein a measurement window is associated with each receiving element for each emitted measurement pulse by means of the associated transmission element for receiving the measurement pulse and a time period is respectively associated for transmitting data to the evaluation unit, wherein the time period is shorter than the measurement window.

14 Claims, 3 Drawing Sheets

(51) Int. Cl.
*G01S 7/484* (2006.01)
*G01S 7/4861* (2020.01)
*G01S 7/487* (2006.01)
*G01S 17/10* (2020.01)
*G01S 17/42* (2006.01)
*G01S 7/4863* (2020.01)

(52) U.S. Cl.
CPC .......... *G01S 7/4861* (2013.01); *G01S 7/4863* (2013.01); *G01S 17/10* (2013.01); *G01S 17/42* (2013.01)

(58) Field of Classification Search
CPC . G01S 7/48; G01S 17/86; G01S 17/87; G01S 17/88; G01J 11/00
USPC .............................................. 250/214 R, 221
See application file for complete search history.

METHOD AND DEVICE FOR OPTICAL DISTANCE MEASUREMENT COMPRISING A SINGLE EVALUATION UNIT WITH TIME MULTIPLEXING TO EVALUATE REFLECTED MEASUREMENT PULSES

CROSS REFERENCE TO RELATED APPLICATIONS

This application takes priority from German Application No. 18157748.7, filed on Feb. 21, 2018, the contents of which are incorporated by reference herein.

TECHNICAL FIELD

The invention relates to a method as well as a device for optical distance measurement.

BACKGROUND

Optical distance measurements, in particular, for use in the unmanned navigation of vehicles, are known from the most recent background art. They are based on the time-of-flight principle, wherein a scanning sensor is used, in particular, a LIDAR (abbreviation for "light detection and ranging") sensor, which emits periodic measurement pulses, which are reflected on objects, wherein the reflected measurement pulses are detected. With the aid of the light speed, the distance away from these objects can be concluded from the determination of the time duration of the measurement pulses from the sensor to the objects and back again.

However, the method known from the most recent background art is unfavourable due to the fact that, in order to avoid aliasing effects, the measurement pulses cannot be successively emitted at any speed since no clear association of reflections is ordinarily possible. At the same time, the time duration of the measurement pulse, meaning the time the measurement pulse requires until it reaches the scanning apparatus again, cannot be accelerated. In order to scan a distance range that is located far away, after emitting a measurement pulse, it is necessary to wait double the duration period up to the possible object located the furthest away until scanning can take place again. Furthermore, in the most recent background art, it is not possible to set the emphasis of the distance measurement on a certain focus range, a so-called "area of interest". Instead of this, the complete range between the focus range and the scanning apparatus is continuously measured, although only the focus range is actually of interest.

EP 3 168 641 A1 discloses an improved method for optical distance measurement, according to which, under the use of a transmission matrix for emitting measurement pulses and a receiving matrix for receiving these, only subsets of these transmission elements belonging to the transmission matrix are activated.

SUMMARY

An object of the invention is to improve a method as well as a device for distance measurement in such a way that the method for distance measurement takes less time. At the same time, by means of the method, it should be made possible to be able to set the focus of the distance measurement onto a certain distance range.

The above-mentioned task is achieved by means of a method according to the invention for optical distance measurement, wherein the method comprises emitting measurement pulses by means of transmission elements and receiving reflected measurement pulses by means of receiving elements. One transmission element is associated with each of the receiving elements. In particular, the association between transmission elements and receiving elements is one-to-one.

The method comprises the definition of at least one first group of receiving elements comprising N receiving elements. The transmission elements associated with the first group of receiving elements each emit at least one measurement pulse, more preferably a plurality of measurement pulses, for distance measurement. Emitted measurement pulses are reflected on at least one object within a measurement range and, by means of the receiving elements of the first group, they are received in the form of reflected measurement pulses.

In order to evaluate the reflected measurement pulses received by the receiving elements of the first group, a single evaluation unit is used with the aid of time multiplexing. Thereby, a measurement window with a measurement window period for receiving the measurement pulse and a time period for transferring the data to the evaluation unit are respectively associated with each receiving element of the first group for each emitted measurement pulse by means of the associated transmission element. Thereby, the time period is shorter than the measurement window period. The evaluation unit is only actively connected to the receiving elements of the first group during the respectively associated time periods.

The measurement pulse reflected by the object has to do with a measurement pulse, which was previously emitted so that its dispersion direction has changed by having been reflected on the object. Thereby, the reflected measurement pulse can be understood as an echo of the emitted measurement pulse. In particular, by means of the method, the duration of the measurement pulses travelling to the objects, on which they are reflected, is detected and, from this, with the help of the light speed, the distance the respective measurement pulse has travelled to the object is determined.

An optical distance measurement is characterized in that, under the use of optical signals, here being optical measurement pulses, distances are determined. A distance is understood under the term "distance". The distance travelled by the measurement pulse is understood as the path between the transmission element which emitted the measurement pulse and the object that reflected this, plus the path between the object and the receiving element that received the correspondingly reflected element. In particular, the method entails taking the exact position of the transmission element and the receiving element under consideration, in particular, in relation to each other. Since the at least one object typically has to do with a three-dimensional object in such a way that several regions of the object can be arranged closer and other regions of the object can be arranged further away, with the term "distance away from the object", the distance from at least one point of the object is intended and that being the point where the measurement pulse hit and on which this was reflected. Duration is understood as the time that the measurement pulse required for the previously described distance is intended. The method, above all, is used for distance measurement for application in the field of unmanned vehicle navigation. Above all, the method has to do with a LIDAR method.

In particular, a measurement pulse has to do with an optical signal, more preferably, an electromagnetic signal. The measurement pulse preferably has a wavelength, which does not originate from the range visible to the human eye.

Preferably, invisible infrared is used for security reasons. Preferably, a measurement pulse comprises a pulse duration so that the measurement pulse can be understood as a time-limited portion of electromagnetic radiation. Since a measurement pulse is an electromagnetic signal and, thereby, the speed of the measurement pulse is known, by means of the light speed, it can be concluded from the duration of a measurement pulse what path the measurement pulse has travelled during the period.

The first group of receiving elements has, in particular, to do with a subset of receiving elements of a device for distance measurement. Thereby, the first group comprises N receiving elements, wherein N is a positive natural number. In particular, N is a natural number greater than 1, more preferably between 2 and 10. In particular, N is understood as a multiplex factor of the time multiplexing. Thereby, N describes from how many receiving elements data can be evaluated with the aid of the evaluation unit by corresponding time periods being associated with these.

In order to evaluate the reflected measurement pulses received by the receiving elements of the first group, a single evaluation unit is used with the aid of time multiplexing. In other words, the same evaluation unit is used to evaluate data of all N receiving elements of the first group. For this purpose, the evaluation unit is connected to the first group of receiving elements in such a way that they can evaluate data from these. In particular, an individual channel exists between the first group of receiving elements and the evaluation unit for data transmission. By means of time multiplexing, this individual channel for transmitting data can be used by a plurality of receiving elements, thereby being the receiving elements of the first group, by a time period for data transmission respectively being associated with the receiving elements of the first group. Thereby, the time period is selected to be shorter than the measurement window period so that more than one receiving element can transmit data to the evaluation unit within a measurement window period.

The measurement window is selected in such a way that it is directly subsequent to a respective emission time of the measurement pulse by means of the corresponding transmission element and its measurement window period corresponds to double the maximum duration of a measurement pulse. The time window is referred to as the maximum duration that a measurement pulse would require in order to move from the transmission element to an object located the furthest away and back to the associated receiving element. The maximum duration defines the measurement range, from which reflected measurement pulses can be expected.

After the measurement window period has passed, receiving a reflected measurement pulse can no longer be expected.

If a transmission element emits a plurality of measurement pulses, a plurality of measurement windows are associated with the associated receiving element, which begin at different points in time, however, preferably all have the same measurement window period.

The evaluation unit is preferably only actively connected to the respective receiving elements of the first group during the respectively associated time periods. The term "actively connected" is particularly to be understood in that only during the respective time period can the evaluation unit receive data from the respective receiving element while it is ruled out that data are received by other receiving elements of the first group. Thereby, the evaluation unit is only connected to one receiving element of the first group in a selective manner as regards time. In other words, only during the associated time period is a data transmission of the corresponding receiving element to the evaluation unit allowed while a data transmission from the remaining receiving elements is not possible. According to an embodiment of the invention, each receiving element thereby only obtains the associated time period for data transmission so that received measurement pulses are only passed on for evaluation during the time period and are thereby evaluated. Outside of the time period, no data transmission take place so that no evaluation of received measurement pulses is possible outside of the time period. Thereby, in comparison to the most recent background art, the evaluation unit is not switched on continuously for the data transmission of only one receiving element, but the evaluation unit is specifically connected to the respective receiving elements of the first group for certain time periods.

The evaluation unit is, above all, designed to convert the received measurement pulses into digital data. In the case of the evaluation unit, it has to do with a time-to-digital converter.

By means of the method according to an embodiment of the invention, the evaluation unit can continuously be used, wherein, however, the data of a plurality of receiving elements and thereby, a plurality of measurement pulses can be evaluated within a short period of time, meaning within a period, in which only one measurement pulse could be evaluated otherwise. The method allows for an optimal use of the evaluation unit. Via time multiplexing, the evaluation unit is continuously taken advantage of and used to its full capacity.

In particular, the method comprises the definition of a plurality of first groups of receiving elements. In particular, all receiving elements of a device are divided into groups of receiving elements for carrying out the method, which altogether comprise N receiving elements respectively. Thereby, a single evaluation unit is respectively used for evaluating the receiving elements of a group respectively. Thereby, all receiving elements are divided into groups with N receiving elements, wherein one evaluation unit is respectively associated with the respective groups. Above all, for each of the groups, one measurement is conducted, wherein, one measurement is understood as the definition of the group comprising N receiving elements, emitting one measurement pulse by means of the transmission elements associated with the N receiving elements, receiving the reflected measurement pulses by means of the N receiving elements and evaluating the measurement pulses reflected by the N receiving elements by means of time multiplexing and the one evaluation unit. The measurements can be conducted simultaneously or successively.

If, for example, N is 2, all receiving elements are divided into groups of two, wherein a single evaluation unit is associated with each group of two for evaluation. If, for example, N is 3, all receiving elements are divided into groups of three, wherein an evaluation unit is associated with each group of three for evaluation.

Preferably, the time periods associated with the N receiving elements each have a duration amounting to a fraction of the measurement window period, namely the measurement window period/N. Thereby, the time periods are a fraction, and that being a $N^{th}$ fraction, of the measurement window period. Thereby, the time periods can be temporally offset to one another.

In particular, the time periods, which are associated with the receiving elements of the first group, are successive as regards time so that the evaluation unit is continuously actively connected to a receiving element, thereby being used to its full capacity.

The transmission elements associated with the first group of receiving elements each emit at least one measurement pulse for distance measurement, in particular, in a time-delayed manner to one another. In particular, the time interval of temporally successive measurement pulses amounts to the measurement window period/N. Thereby, the successive measurement pulses as regards time do not originate from the same transmission element, but from different transmission elements, which send measurement pulses to each other in a time-delayed manner.

The transmission elements associated with the first group of receiving elements can each emit a sequence of measurement pulses, wherein successive measurement pulses emitted by the same transmission element comprise a time interval, which corresponds to the measurement window period. Thereby, successive measurement pulses of same transmission element preferably occur at a time interval amounting to the measurement window period.

Since the measurement windows associated with the receiving elements preferably begin with the point in time the corresponding measurement pulse is emitted, the measurement windows, which are associated with a receiving element when emitting a sequence of measurement pulses, also occur at an interval amounting to the measurement window period. Successive measurement windows of all N receiving elements are preferably temporally offset to one another at an interval from the measurement window period/N.

In particular, the time period associated with a receiving element of the first group is temporally arranged within the respective measurement window and, above all, prior to an end of the measurement window. In particular, the time period, in which the corresponding receiving element is actively connected to the evaluation unit for data transmission, forms the last Nth part of the measurement window associated with the receiving element for precisely this measurement pulsed respectively. Thereby, only measurement pulses are evaluated, which have been reflected within the last Nth part from the measurement range since measurement pulses reflected on closer objects arrive too early, thereby being outside of the associated time period. If N is 2 for example, the time period that has been associated with the receiving element forms the last half of the measurement window so that only measurement pulses from the half of the measurement range located further away are evaluated. If N is 3, for example, the time period corresponds to the last third of the measuring window, so only measurement pulses from the most distant one-third of the measuring range are used for the evaluation.

Preferably, a distance range can be associated with the time periods, wherein the method comprises the selection of a number for N based on a focus range of the distance measurement. The distance range can comprise close-range, medium-range and/or far-away distances. In the case of the focus range, in other words, the "area of interest", the distance measurement particularly has to do with a subregion of the measurement range, which is of the greatest interest. Above, the focus range can comprise a region around the horizontal since, particularly there, objects can be expected, the detection of which are essential in the field of unmanned navigation. While the measurement range comprises all reachable objects and thus distances, the focus range forms a subset of these. For example, the focus range can only comprise distances that are particularly far away.

Therefore, in particular, a distance range can be associated with the time periods since they are temporally arranged prior to the end of a measurement window and reflected measurement pulses from closer objects arrive outside of the associated time period depending on the selection of N. The higher N is selected to be, the more the range measured is moved back within the measurement region. If N is 2 for example, the time period forms the last half of the measurement window. If N is 4 for example, the time period forms the last quarter of the measurement window. In the case of N=4, in contrast to N=2, objects located further away are detected.

In particular, this is therefore an advantage since different distance ranges can have different informational content from a system point of view. Thereby, N can be selected based on a focus range of the distance measurement, wherein, the entire range between the focus range and a device for distance measurement is not continuously measured. Thus, due to time multiplexing, either only the measurement pulses, which originate from the focus range are actually evaluated or the focus range are scanned more intensively than the areas of the measurement range located outside of the focus range. The focus range can be exposed for a shorter period of time altogether since less time for scanning is required. If the same time is used, a considerably higher resolution can be achieved.

In particular, the method can entail conducting measurements using different multiplex factors. Due to conducting measurements with different multiplex factors, the focus range can be scanned more intensively while, nevertheless, a greater area of the measurement range is measured with less intensity. For example, the entire measurement range can be measured while the focus range is scanned more intensely. Thereby, it is possible to achieve an "overscan" of a focus range within a measurement range and this within a period, which is smaller than is required with other methods by means of time multiplexing. Overall, thereby, different ranges can be measured at different scanning rates, wherein the multiplex factors are selected in such a way that, in particular, the focus range, meaning the one located on the distance range, which is of the greatest interest, is scanned with more intensity.

In particular, the method entails conducting the measurements with N=2 and/or measurements with N=3.

Above all, the method comprises conducting measurements, which achieve a linearly ascending or linearly descending overscan. Above all, by means of the method, measurements with a certain multiplex factor or, subsequently, measurements with linearly descending or ascending multiplex factors are conducted. For example, the method can initially comprise measurements with N=2 and subsequent measurements with N=3, or the other way around.

Furthermore, the method can additionally comprise measurements, in which the time period, which is associated with a receiving element and during which there is an active connection to the evaluation unit for data transmission, is identical to the measurement window period. This would correspond to a theoretical multiplex factor of N=1. This consequently does not have to do with time multiplexing in accordance with the above-mentioned method since the evaluation unit is actively connected to a receiving element during the entire measurement window. Nevertheless, such measurements can be used to focus on the entire measurement range. Such measurements can, above all, be conducted before or after the measurements using N=2 as regards time so that they contribute to a linearly ascending or descending overscan.

In another embodiment, the invention comprises a device for optical distance measurement, wherein the device is designed to carry out a method described in the above. According to the embodiment of the invention, the device comprises transmission elements and receiving elements, which are preferably consolidated within a transmission matrix or a receiving matrix. A matrix can, in particular, be understood as a three-dimensional, more preferably a plate-shaped body, on a surface of which the corresponding elements are arranged. In particular, the device has to do with a scanning apparatus, above all, an LIDAR sensor. Preferably, in the case of the transmission elements respectively, it has to do with a laser, while the receiving elements, in particular, are each formed by a diode, more preferably an individual photon avalanche diode. According to the embodiment of the invention, the device comprises at least one, more preferably a plurality of evaluation units, above all, time-to-digital converters, for evaluating received measurement pulses.

Furthermore, the present invention may relate to a computer program product, which comprises a computer-readable storage medium, on which a program is saved, which makes it possible for a computer to carry out an above-mentioned method after it has been loaded into the storage system of the computer, if applicable, in interaction with an above-mentioned device. Furthermore, the invention may relate to a computer-readable storage medium, on which a program is saved, which makes it possible for a computer to carry out an above-mentioned method after it has been loaded into the storage system of the computer, if applicable, in interaction with an above-mentioned device.

BRIEF DESCRIPTION OF THE DRAWINGS

On a schematic level, the figures show.

DETAILED DESCRIPTION OF PREFERRED EMBODIMENTS

Figure 1:
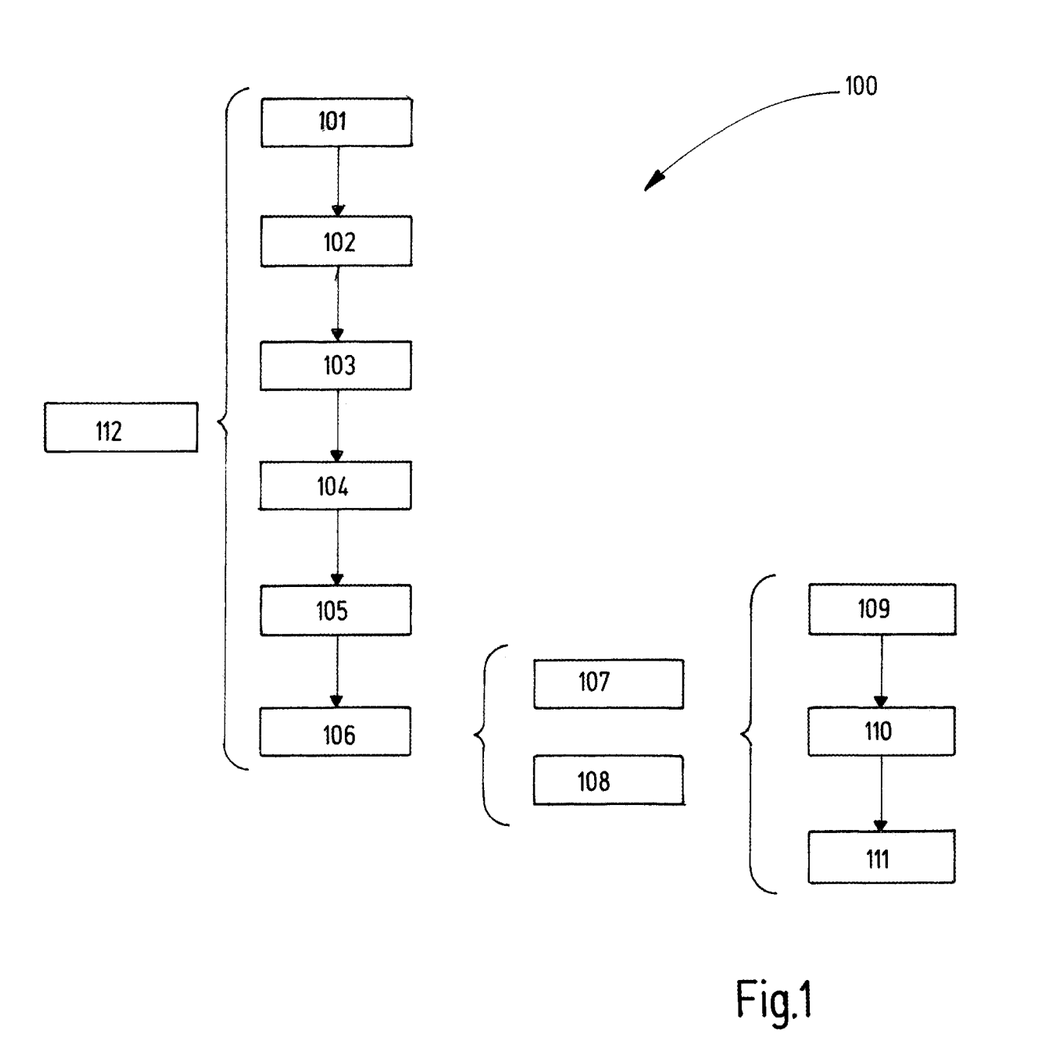
FIG. 1 a process diagram of a method according to the invention.

FIG. 1 shows a process diagram of the method (100) according to the invention.

The method comprises the definition (101) of a first group of receiving elements comprising N receiving elements. Furthermore, the transmission (102) of at least one measurement pulse takes place by means of the transmission elements associated with the first group of receiving elements. In particular, by means of the transmission elements, a sequence of measurement pulses are emitted (103) respectively. Emitted measurement pulses are reflected (104) on objects within the measurement range and are received (105) by means of the N receiving elements of the first group. In order to evaluate (106) the reflected measurement pulses, a single evaluation unit is used (108) and that being by means of time multiplexing (107). Thereby, the time multiplexing (107) and the use (108) of a single evaluation unit comprises the association (109) of a measurement window for each receiving element and for each emitted measurement pulse as well as the association (110) of one time period for each receiving element and for each emitted measurement pulse. Thereby, the time period is shorter than the duration of the measurement window. A transmission of data (111) to the evaluation unit from a receiving element of the first group only takes place within the associated time period.

The aforementioned steps represent conducting (112) a measurement using the time multiplex factor N. Thereby, the method (100) particularly comprises conducting a plurality of measurements using the same multiplex factor. Above all, all receiving elements of a device are divided into groups of N receiving elements for carrying out the method and the measurement is carried out for each of these groups.

Favourably, the method comprises conducting a plurality of measurements using the time multiplexing factor N=2. as well as conducting a plurality of measurements using the time multiplexing factor N=3. Furthermore, the method can comprise measurements, in which the time period is identical to the measurement window period.

Figure 2:
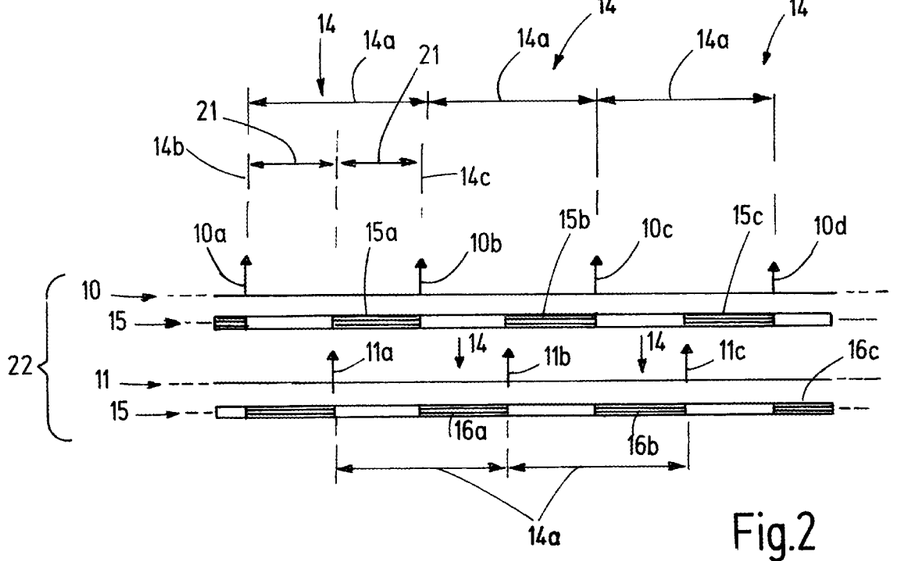
FIG. 2 a time chart of a method according to the invention.

FIG. 2 describes a time diagram of a method (100) according to the invention, and that being a temporal succession (10) of measurement pulses of a first transmission element, a temporal succession (11) of measurement pulses of a second transmission element as well is the point in time (15) of the active connection of receiving elements associated with the transmission elements to an evaluation unit.

In the first row of FIG. 2, the temporal succession (10) of measurement pulses of a first transmission element is shown. The first transmission element emits four measurement pulses (10a, 10b, 10c, 10d). For each emitted measurement pulse (10a, 10b, 10c, 10d), a measurement window (14), the beginning (14b) of which starts with emitting the measurement pulse and the end (14c) of which takes place after the measurement window period (14a) has passed, can be associated with the first receiving element, which is associated with the first transmission element. The measurement pulses (10a, 10b, 10c, 10d) are emitted at a time interval, which corresponds to the measurement window period (14a).

In the second row of the diagram in FIG. 2, point in time (15) are shown, at which the first receiving element is actively connected to the evaluation unit. The first receiving element associated with the first transmission element is connected to the evaluation unit for each emitted measurement pulse of the first transmission element for a time period (15a, 15b, 15c). The time periods (15a, 15b, 15c) each form the last half of the respectively associated measurement window (14).

With a time delay with regard to the first transmission element, a second transmission element emits measurement pulses (11a, 11b, 11c), the temporal succession of which (11) can be viewed in the third row in FIG. 2. The measurement pulses (11a, 11b, 11c) of the second transmission element also have a time of a measurement window period (14a) between each other. The time delay between the emitted measurement pulses of the first transmission element and of the second transmission element amounts to half of the measurement window period (14a).

The second transmission element is associated with the second receiving element, wherein the point in time (15) of the active connection of the second receiving element to the evaluation unit can be viewed in the fourth row of FIG. 2. Measurement windows (14) are also associated with a second receiving element for each emitted measurement pulse (11a, 11b, 11c) of the second transmission element, which are directly subsequent as regards time to emitting the corresponding measurement pulse and amount to the measurement window period (14a). One time period (16a, 16b) is associated with the second receiving element for each emitted measurement pulse (11a, 11b, 11c) of the second transmission element, at which this is actively connected to the evaluation unit. The time periods (16a, 16b) are each the last half of the respective measurement window again.

The first and the second receiving element represent a first group. The time interval (21) between successive measurement pulses of the group corresponds to half of the measurement window period (14a).

Both the first receiving element as well as the second receiving element are connected to the same evaluation unit. Thereby, the evaluation unit is alternately actively connected to the first receiving element and the second receiving element, and that being for a period, which corresponds to half of the measurement window period (14a) as regards time. Thereby, FIG. 2 represents how data from two receiving elements can be evaluated with the aid of a single evaluation unit and with the aid of time multiplexing using the factor N=2. In other words, FIG. 2 shows the temporal succession of measurements (22) with N=2.

Figure 3:
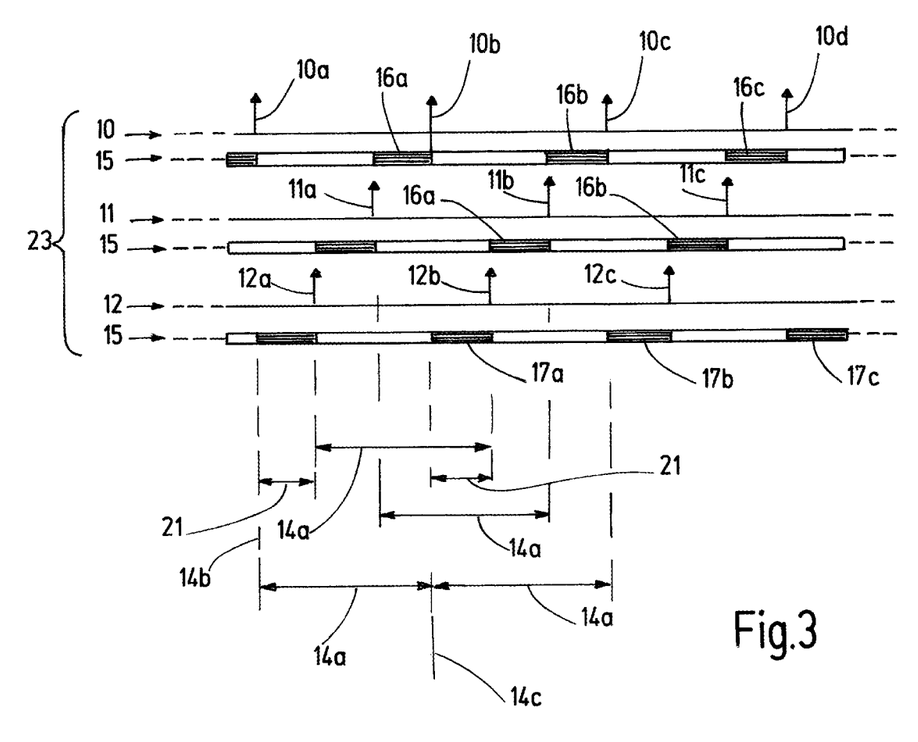
FIG. 3 a time chart of a method according to the invention.

FIG. 3 represents a temporal succession of a method according to the invention where the multiplex factor N=3 is used. In other words, FIG. 3 shows the temporal succession of measurements (23) used N=3.

Again, the upper four rows represent the temporal succession (10) of the measurement pulses of a first transmission element, the point in time (15) of the active connection of the corresponding first receiving element to evaluation unit, the temporal succession (11) of measurement pulses of a second transmission element and the corresponding points in time (15) of the active connection of the corresponding second receiving element to the evaluation unit.

Both the first transmission element as well as the second transmission element emit time pulses at a time interval amounting to the measurement window period (14a). A third transmission element also emits measurement pulses (12a, 12b, 12c) with the same time interval. The temporal succession (12) of the measurement pulses (12a, 12b, 12c) of the third transmission element is shown in the fifth row of FIG. 3. Since the multiplex factor is now N=3, the interval between the successive measurement pulses (21) is a third of the measurement window period (14a). Furthermore, the time periods (15a, 15b, 15c, 16a, 16b) at which the first and the second receiving element are connected to the evaluation unit only amount to a third of the measurement window period (14a) respectively, and these correspond exactly to the last third of the respectively associated measurement window (14).

In the last row of FIG. 3, the point in time of the active connection (15) of a third receiving element, which is associated with the third transmission element, to the evaluation unit is shown. Time periods (17a, 17b, 17c) are also associated with the third receiving element, at which it is actively connected to the one evaluation unit. All three receiving elements are connected to the same evaluation unit, wherein this is only actively connected to the evaluation unit during the respectively associated time periods (15a, 15b, 15c, 16a, 16b, 17a, 17b, 17c). The duration of the time periods (15a, 15b, 15c, 16a, 16b, 17a, 17b, 17c) is a third of the measurement window period (14a). The time periods (15a, 15b, 15c, 16a, 16b, 17a, 17b) form the last half of the measurement window (14).

Figure 4:
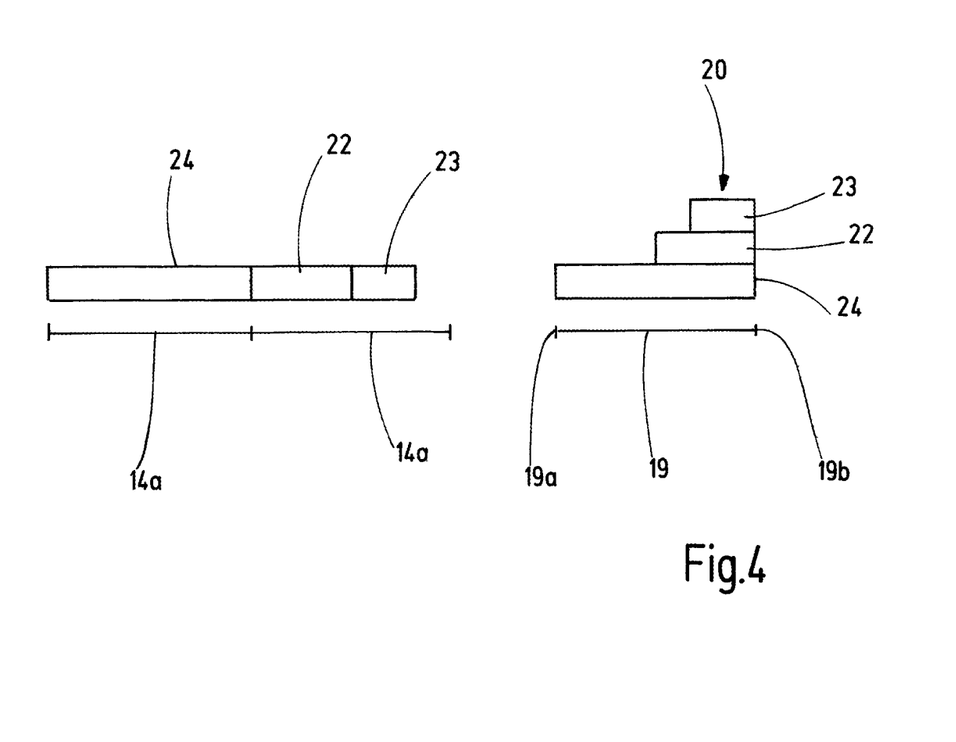
FIG. 4 the time requirement of a method according to the invention as well as the scanning of a measurement range of the method, and
FIG. 5 the scanning of a measurement range for a method according to the invention.

The left half of FIG. 4 represents the time requirement and the right half of the figure represents the scanning of the measurement range (19) for a method (100) according to the invention.

In the case of the basic method, measurements are conducted at various multiplex factors. While the underlying method in FIG. 4 comprises both measurements (22) with the multiplex factor N=2, as well as measurements (23) with using N=3 according to FIGS. 2 and 3, it also comprises measurements (24) where the time periods associated with the receiving elements comprise the duration of a measurement window. All measurements with N=2 are conducted simultaneously. The same applies to measurements with N=3.

The time requirement for carrying out the entire method amounts to an entire measurement window period (14a) for the measurements (24) described above where the time periods associated with the receiving elements amount to the duration of a measurement window, one half of a measurement window period (14a) for the measurements (22) using N=2 and a third of a measurement window period (14a) for the measurements (23) using N=3. Thereby, altogether, the time requirement is less than twice the duration (14a) of a measurement window (14).

In the right half of the image of FIG. 4, the scanning of the measurement range (19) of the method can be seen. The measurement range (19) extends from one nearby end (19a) up to a distanced end (19b). The remote end (19b) is characterized by the fact that no reflections are to be expected from objects that are further away than this end. Thus, it marks the maximum distance measurement range. The nearby end (19a) preferably directly adjoins the transmission elements.

Since the different distance ranges can be associated with the time periods of measurements with different values for N, in the present case, the area of the measurement range (19) located far away is scanned at a considerably higher intensity than the nearby area. This has to do with the fact that, in the case of measurements (22) using N=2 only reflected measurement pulses from the half of the measurement range (19) located further away are evaluated since, at the respective receiving time, the corresponding receiving element is not actively connected to the evaluation unit. In the case of measurements (23) using N=3, analogously, only reflected measurement pulses from the most distant third of the measurement range (19) are evaluated. In the case of measurements (24) where the time period corresponds to the measurement window period (14a), reflected measurement pulses from the entire measurement range (19) are passed on for evaluation. The focus range (20) of the method is therefore on the other distance range of the measurement range (19) located further away.

Figure 5:
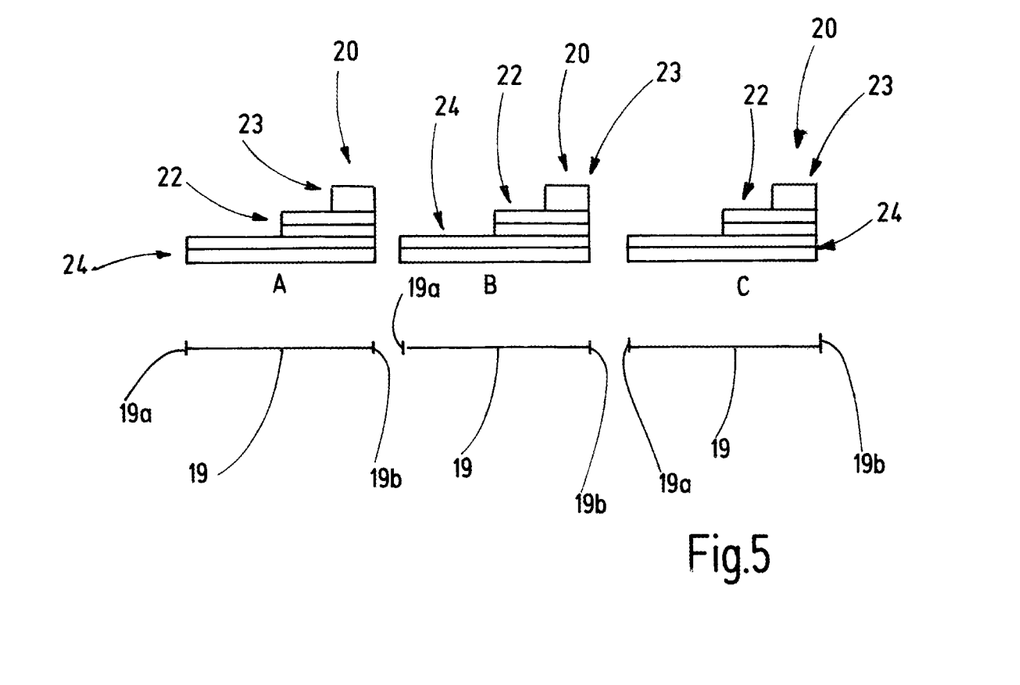

FIG. 5 represents the scanning of a measurement range (19) in the case of a linearly ascending overscan. Altogether, there are three receiving elements, A, B, C, which are used according to the following method:

The corresponding transmission elements emit measurement pulses in the following pattern: 2×A, 2×B, 2×C, AB, BC, CA, 2×ABC.

Initially, measurements (24) are conducted where the time period for data transmission of the receiving elements with one evaluation unit corresponds to the entire measurement window period for receiving the reflections of the measurement pulses. Two measurements pulses are emitted by the transmission element associated with receiving element A, and that being at an interval amounting to a measurement window period, then two measurement pulses from the transmission element associated with receiving element B and then two from the transmission element associated with the receiving element C. By means of these six measurements (24) data from the entire measurement range (19) is evaluated since the receiving elements are actively connected to the evaluation unit during the entire measurement window period (14a).

Subsequently, three measurements (22) are carried out using a time multiplex factor of N=2. Consequently, the transmission element associated with receiving element A and the transmission element associated with receiving element B initially each emit one measurement pulse, and that being at a time delay amounting to half the measurement window period. The same applies to the transmission element associated with receiving element B and the transmission element associated with receiving elements C and, subsequently, to the transmission element associated with receiving element C and the transmission element associated with receiving element A.

Following this, a measurement (23) with the time multiplex factor N=3 takes place. All three transmission elements associated with receiving elements A, B, and C send a measurement pulse any time delay amounting to one third of the measurement window period (14a).

Since the time multiplex factor N increases in a linear manner, here, it has to do with a linearly ascending overscan. As can be seen in FIG. 5, thereby, the entire measurement range for each receiving element is scanned two times, thereby being scanned a total of six times, the middle-distance range is scanned a total of twelve times while the most distant range is scanned a total of 18 times. The focus range (20) thereby lies clearly within the furthest region of the measurement range (19). The required time for the aforementioned measurements corresponds to ten measurement window periods (14a). By means of the method according to the invention, thereby, not only a considerable reduction of the required time is made possible but also the determination of a higher scanning rate for a focus range (20).

REFERENCE LIST 10 temporal succession of the measurement pulses of the first transmission element
10a, 10b, 10c, 10d measurement pulses of the first transmission element
11 temporal succession of the measurement pulses of the second transmission element
11a, 11b, 11c, measurement pulses of the second transmission element
12 temporal succession of the measurement pulses of the second transmission element
12a, 12b, 12c, measurement pulses of the third transmission element
14 measurement window
14a duration of the measurement window
14b beginning of the measurement window
14c end of the measurement window
15 time points for the active connection to the evaluation unit
15a, 15b, 15c, 16a, time periods
16b, 17a, 17b, 17c
19 measurement range
19a nearby end
19b removed end
20 focus range
21 distance of successive chronological measurement pulses
22 measurements using N=2
23 measurements using N=3
24 measurements with duration of the time period=measurement window period
100 method
101 definition of a first group of receiving elements comprising N receiving elements
102 emitting a measurement pulse by means of the transmission elements associated with the N receiving elements
103 emitting a sequence of measurement pulses by means of the transmission elements associated with the N receiving elements.
104 reflection on objects within the measurement range
105 receiving the reflected measurement pulses by means of the N receiving elements
106 evaluation of reflected measurement pulses received by N receiving elements
107 time multiplexing
108 use of a single evaluation unit
109 association of a measurement window for each receiving element and emitted measurement pulse by means of the associated transmission element
110 association of a time period for each receiving element and emitted measurement pulse
111 transfer of data to the evaluation unit
112 conducting a measurement with the time multiplex factor N

What is claimed is:
1. A method for optical distance measurement,
wherein the method comprises emitting measurement pulses by means of transmission elements and receiving reflected measurement pulses by means of receiving elements,
wherein one transmission element is associated with the receiving elements respectively,
wherein the method comprises the definition of at least one first group of receiving elements comprising N receiving elements,
wherein the transmission elements associated with the first group of receiving elements each emits at least one measurement pulse for distance measurement,
wherein emitted measurement pulses are reflected on at least one object within a measurement range and
wherein the receiving elements of the first group receive the reflected measurement pulses,
wherein in order to evaluate the reflected measurement pulses received by the receiving elements of the first group, a single evaluation unit is used with the aid of time multiplexing,
wherein a measurement window with a measurement window period is associated with each receiving element of the first group for each emitted measurement pulse by means of the associated transmission element respectively for receiving the measurement pulse,
wherein a time period is associated with each receiving element of the first group for each emitted measurement pulse by means of the associated transmission element respectively for transmitting data to the evaluation unit,
wherein the time period is shorter than the measurement window period,
wherein the evaluation unit is only actively connected to the receiving elements of the first group during the respectively associated time periods,
so that each receiving element only obtains the associated time period for transmitting data and received measure- ment pulses are only passed on for evaluation and evaluated during the time period, and wherein no transmission of data takes place outside of the time period so that no evaluation of measurement pulses received outside of the time period is possible.

2. The method of claim 1, wherein the time periods associated with the N receiving elements each comprise a duration amounting to the measurement window period/N.

3. The method of claim 1, wherein the time periods are temporally successive to one another.

4. The method of claim 1, wherein the transmission elements associated with the first group of receiving elements each emit at least one measurement pulse for distance measurement in a time-delayed manner to one another.

5. The method of claim 4, wherein a time interval of successive measurement pulses is the measurement window period/N.

6. The method of claim 1, wherein the transmission elements associated with the first group of receiving elements each emit a sequence of measurement pulses with a time interval amounting to the measurement window period.

7. The method of claim 1, wherein the time period associated with a receiving element is arranged prior to an end of the measurement window as regards time.

8. The method of claim 1,
wherein a distance range can be associated with the time periods,
wherein the method comprises the selection of a number for N based on a focus range of the distance measurement.

9. The method of claim 1,
wherein N is a multiplex factor of time multiplexing,
wherein the method comprises carrying out measurements using different multiplex factors.

10. The method of claim 1, wherein the method comprises conducting measurements with N=2.

11. The method of claim 1, wherein the method comprises conducting measurements with N=3.

12. A device for optical distance measurement wherein the device is adapted to carry out the method according to claim 1, wherein the device comprises transmission elements, receiving elements and at least one evaluation unit for evaluating received measurement pulses.

13. A non-transitory computer program product, which comprises a computer-readable storage medium, on which a program is saved, which makes it possible for a computer to carry out a method in accordance with claim 1 after it has been loaded into the storage system of the computer.

14. A non-transitory computer-readable storage medium, on which a program is saved, which makes it possible for a computer to carry out a method in accordance with claim 1 after it has been loaded into the storage system of the computer.

* * * * *